Figure 1:
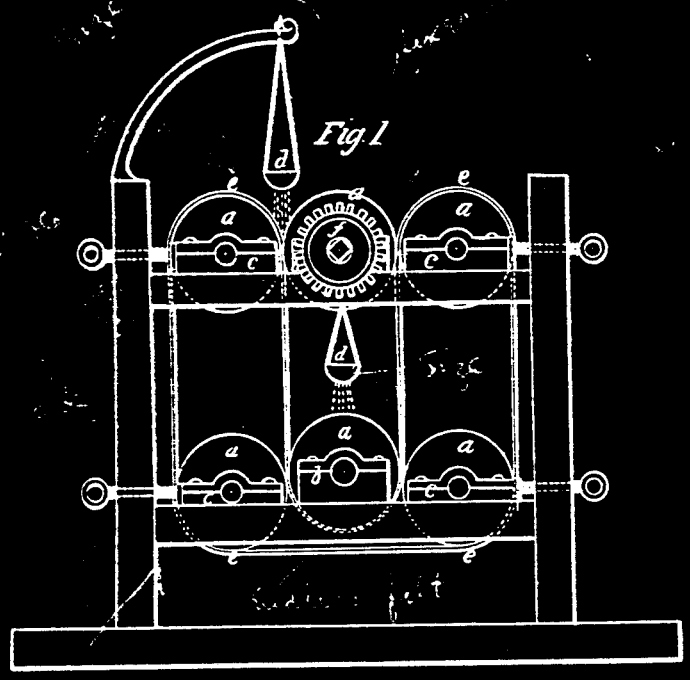
Figure 3:
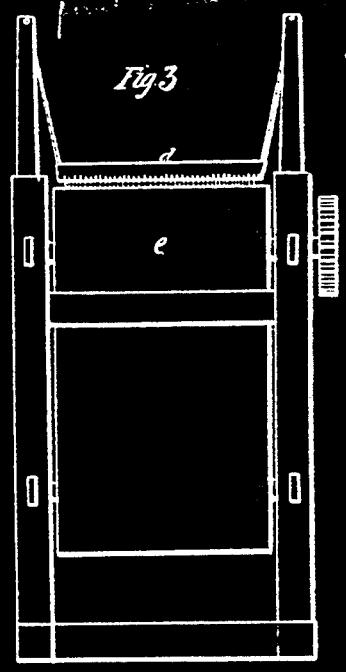
Figure 2:
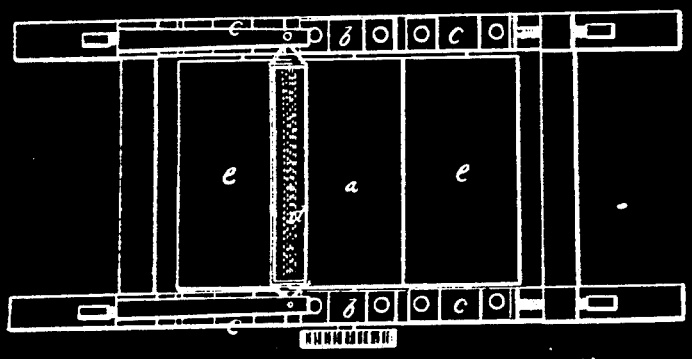

118-239

NO SPECIFICATION AVAILABLE.

BEST AVAILABLE COPY

SEARCH ROOM

118/239

No. 7,218

J. Ames.
Sizing Paper.
Patented Sept. 1, 1832.

United States Patent Office

PTO - BOYERS, PA Duty Station

MISSING PAGE TEMPORARY NOTICE

PATENT # X000 7218 FOR ISSUE DATE 9-1-1832

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Pg 2 thru end

Data Conversion Operation

Boyers, Pa